Figure 1:
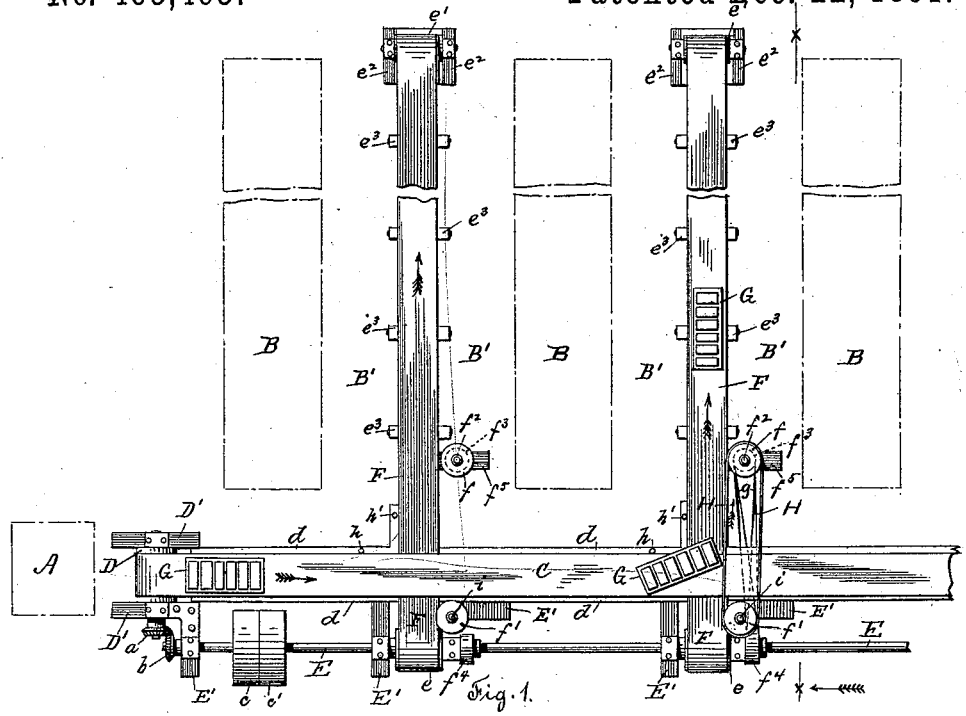

(No Model.)

J. CONNLEY & H. J. VIETH.
CONVEYER.

No. 465,463. Patented Dec. 22, 1891.

Witnesses
W. H. Thurston
S. J. Murphy

Inventor
John Connley
Henry J. Vieth

UNITED STATES PATENT OFFICE.

JOHN CONNLEY AND HENRY J. VIETH, OF BARRINGTON, RHODE ISLAND; SAID VIETH ASSIGNOR TO SAID CONNLEY.

CONVEYER.

SPECIFICATION forming part of Letters Patent No. 465,463, dated December 22, 1891.

Application filed November 21, 1890. Serial No. 372,130. (No model.)

*To all whom it may concern:*

Be it known that we, JOHN CONNLEY and HENRY J. VIETH, both of Barrington, in the county of Bristol and State of Rhode Island, have jointly invented certain new and useful Improvements in Conveyers; and we do hereby declare the following specification, taken in connection with the accompanying drawings, forming a part of the same, to be a full, clear, and exact description thereof.

Our invention relates to a system of endless-belt conveyers, and has for its object to enable the articles being transported to be conveyed in two different directions at an angle to each other or to be transferred from one conveyer-belt traveling in a certain direction to another conveyer-belt traveling at an angle to said first belt.

To that end our invention consists in certain combinations and arrangements of parts, as hereinafter described.

Our invention is adapted for use in the conveyance of any article or articles by endless-belt conveyers where it is desired to change the direction in which the articles are to be transported or to transfer the articles from one belt to another belt traveling at an angle thereto. We have heretofore applied it for use in a brick-yard for conveying the molded bricks from the molding-machine to the drying-racks, which are usually arranged in rows parallel to each other, and in the accompanying drawings we have illustrated our invention as applied to such purpose.

In molding bricks by machinery a series of bricks—say six in number—are molded simultaneously, and these molded bricks are deposited upon a piece of board or "pallet," as it is called, and these pallets with the molded bricks thereon are then taken and placed in the drying-racks.

Heretofore the pallets of molded bricks have been transported from the molding-machine to the drying-racks by attendants with wheelbarrows or trucks, which method, as the drying-racks are of considerable length and of considerable number, requires a number of attendants to convey to and place in the racks the product of each machine, the number of attendants varying according to the distance to be traveled.

In the application of our invention for transporting the pallets of bricks from the molding-machine to the drying-racks, we arrange a main endless belt to run from the machine at right angles to the parallel rows of drying-racks and near the ends thereof. We then arrange one or more auxiliary belts at right angles to said main belt, said auxiliary belts extending down the passage-ways between the rows of drying-racks. The pallets of bricks are deposited upon the main belt at the machine and are conveyed by said belt to a point where one or another of the auxiliary belts is arranged, and are then, by means of mechanism hereinafter described, caused to be transferred from the main belt to the auxiliary belt, by which they are conveyed down the passage-way between two of the drying-racks, where they are taken by attendants and placed in position upon the racks.

Figure 2:
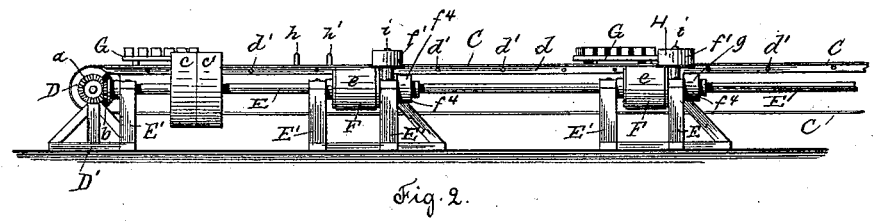
Figure 3:
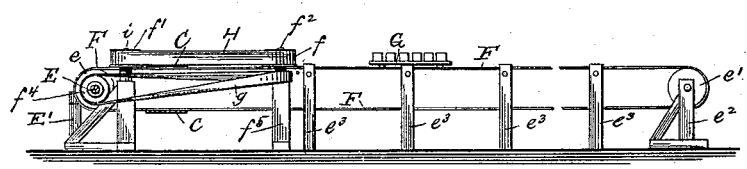

Referring to the drawings, Figure 1 is a plan view of our invention as applied for use for transporting pallets of bricks to the drying-racks. Fig. 2 is a front elevation; and Fig. 3 is a side elevation, partly in section, the section being taken on the line $x\ x$ of Fig. 1.

A represents the location of the molding-machine, and B B B the location and arrangement of a series of drying-racks, of which there may be any desired number, said racks being arranged in parallel rows, as shown, with passage-ways B' between them.

C is a main endless conveyer-belt extending from the machine along at right angles to the racks B and near the ends thereof. The endless belt C is mounted upon suitable pulleys supported in standards at its opposite ends, one of which pulleys is represented at D, said pulley being supported in the standard D', the other pulley and standard not being shown in the drawings, the belt C being shown as broken away to indicate that it may extend to any desired distance from the machine.

To the pulley D power is to be applied in any convenient manner to revolve the same and give motion to the endless belt C.

In the drawings, the pulley D is shown as operated by means of a bevel-gear $a$, secured to the axle of said pulley, said bevel-gear $a$ meshing with another bevel-gear $b$, secured to the end of a shaft E, which extends parallel to the belt C, said shaft being mounted in and supported by suitable standards E' E', as shown. The shaft E is provided with a fast and loose pulley $c\ c'$, so as to be driven by a belt from any convenient source of power. The standard D' and the corresponding standard at the opposite end of the belt C are preferably connected together by string-pieces $d$, in which are mounted friction-rollers $d'$ to support the belt.

At right angles to the belt C are arranged the auxiliary belt F F, as shown at Fig. 1. In the drawings we have shown an auxiliary belt arranged in each of the passage-ways; but, if desired, only one such auxiliary belt may be employed, said belt with its appurtenances being moved from one passage-way to another as the racks are filled. As the arrangement of each of the auxiliary belts, where more than one is employed, will be the same, a description of one will be sufficient. The auxiliary belt F is mounted at one end upon a pulley $e$, secured to the shaft E, by means of which pulley power is communicated to said auxiliary belt, and at the other end upon a pulley $e'$, supported in a suitable standard $e^2$. Standards $e^3$ are arranged at suitable intervals along the length of the belt F, in which standards are mounted friction-rollers to support said belt. The auxiliary belt F is arranged with relation to the main belt C in such manner that the upper portion of belt F shall pass under the upper portion of belt C, as shown in the drawings.

The mechanism for causing the article being conveyed, as the pallet of bricks G, to be transferred from the main belt C to the auxiliary belt F, is as follows: Arranged across the top of the main endless belt C and with its faces substantially at right angles to the face of the belt C is a short endless belt H, which may be termed a "deflecting-belt." This belt H is mounted at one end upon a pulley $f$, by means of which motion is imparted to said belt, and at the other end upon a loose pulley $f'$, mounted upon a stud $i$, secured to the standard E'. The pulley $f$ is secured to a short upright shaft $f^2$, supported in a standard $f^5$. Secured to the shaft $f^2$ is another pulley $f^3$, by which said shaft $f^2$ is driven by means of the crossed belt $g$, which passes around the pulley $f^4$ upon the main shaft E. The pulley $f'$ is preferably located somewhat nearer the belt F than the pulley $f$, so that the belt H in the vicinity of said pulley $f'$ will be caused to overlie the belt F and to travel somewhat at an angle thereto, as shown in Fig. 1. A pin or roller $h$ is secured to the frame-work at the side of the belt C, and another pin or roller $h'$ is placed at the side of the belt F, as shown in Fig. 1. These two pins $h\ h'$ are not absolutely necessary, but are useful in guiding the pallet of brick or other article in its transfer from one belt to the other.

The operation of the mechanism above described is as follows: The conveyer-belts C and F and the deflecting-belt H having been set in motion in the direction of the arrows in Fig. 1 by the application of power to the shaft E, and a pallet of bricks having been deposited upon said conveyer-belt at the molding-machine, said pallet is conveyed along by said belt until the forward end of the pallet reaches and comes in contact with the face of the deflecting-belt H, when its farther progress on the belt C will be prevented. The motion of the deflecting-belt will then serve to carry the forward end of said pallet in the direction in which said deflecting-belt is moving, and so that a portion of said forward end of the pallet will be caused to overlie and rest upon the belt F, as shown in Fig. 1, whereupon the combined action of the deflecting-belt H and of the belt F will serve to draw the pallet off of the belt C and onto the belt F, when it will be conveyed along by said belt F to the point where it is to be removed by the attendant and placed upon the drying-rack. The pins $h\ h'$, when employed, will serve to guide the pallet in its transfer from one belt to the other; but, as above stated, these pins are not absolutely necessary, and satisfactory results may be obtained without them.

By the use of the above-described apparatus for conveying bricks from the molding-machine to the drying-racks the number of attendants required to take care of the product of a machine and the consequent expense may be greatly reduced.

While our invention is of great utility in a brick-yard for the purpose set forth, we do not wish to limit ourselves to this or to any other particular use to which said invention may be applied, as it is evident that the same may be employed for a great variety of uses and for the conveyance of a great variety of articles wherever it is desired to transport said articles in two different directions at an angle to each other. It is also obvious that the construction of the different parts and the method of operating the same may be varied without departing from the spirit of our invention.

What we claim as our invention, and desire to secure by Letters Patent, is—

1. The combination of a main conveyer-belt, an auxiliary conveyer-belt arranged to travel at an angle to said main belt, said belts forming a practically-continuous conveyer, and means for deflecting articles being transported from said main belt to said auxiliary belt, substantially as described.

2. The combination of a main conveyer-belt, an auxiliary conveyer-belt arranged to travel at an angle to said main belt, said belts forming a practically-continuous conveyer, and a traveling deflector arranged to move the articles being transported from the main belt to a position where they will be acted upon by the auxiliary belt and drawn from said main belt onto said auxiliary belt, substantially as described.

3. The combination of a main conveyer-belt, an auxiliary conveyer-belt arranged to travel at an angle to said main belt, and a deflecting-belt arranged to extend across the face of said main conveyer-belt, whereby articles being conveyed by said main belt will be interrupted in their travel on said main belt and be transferred to said auxiliary conveyer-belt, substantially as described.

4. The combination of a main conveyer-belt, an auxiliary conveyer-belt arranged to travel at an angle to said main belt, a deflecting-belt to transfer articles being transported from said main belt to said auxiliary belt, and guiding pins or rollers to guide said articles in their transfer from one belt to the other, substantially as described.

JOHN CONNLEY.
HENRY J. VIETH.

Witnesses:
W. H. THURSTON,
S. J. MURPHY.